(12) United States Patent
Chiba et al.

(10) Patent No.: US 7,836,253 B2
(45) Date of Patent: Nov. 16, 2010

(54) CACHE MEMORY HAVING PIPELINE STRUCTURE AND METHOD FOR CONTROLLING THE SAME

(75) Inventors: Satoshi Chiba, Kanagawa (JP); Takumi Kato, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 431 days.

(21) Appl. No.: 11/877,874

(22) Filed: Oct. 24, 2007

(65) Prior Publication Data

US 2008/0098174 A1 Apr. 24, 2008

(30) Foreign Application Priority Data

Oct. 24, 2006 (JP) ............................... 2006-288862

(51) Int. Cl.
*G06F 12/16* (2006.01)
(52) U.S. Cl. ..................................................... 711/118

(58) Field of Classification Search ....................... None
See application file for complete search history.

(56) References Cited

U.S. PATENT DOCUMENTS

2004/0024967 A1* 2/2004 Zhang ........................ 711/118

FOREIGN PATENT DOCUMENTS

EP 1 361 518 11/2003
JP 10-063575 A 3/1998

* cited by examiner

*Primary Examiner*—Tuan V Thai
*Assistant Examiner*—Duc T Doan
(74) *Attorney, Agent, or Firm*—Young & Thompson

(57) ABSTRACT

A cache memory arranged between a processor and a low-speed memory and performing a pipeline processing of a memory access made by the processor. In a first stage, the cache memory reads out a tag address from a tag memory. In a second stage, the cache memory performs a hit decision by a hit decision unit. When the hit decision result is a miss hit, the cache memory performs an update control of the tag memory and a behavior control of a bypass circuit for supplying a data held in a latch circuit to the hit decision unit by bypassing the tag memory in a third stage. The latch circuit is configured to hold a tag address included in a input address supplied from the processor.

16 Claims, 7 Drawing Sheets

RELATED ART

CACHE MEMORY HAVING PIPELINE STRUCTURE AND METHOD FOR CONTROLLING THE SAME

BACKGROUND OF THE INVENTION

1. Field of the Invention

The present invention relates to a cache memory configured to perform a pipeline processing of a memory access from a processor.

2. Description of Related Art

A cache memory that uses a clock synchronous SRAM (synchronous SRAM) and adopts a pipeline structure has been put to practical use. A cache memory having a pipeline structure is arranged between a processor and a low-speed memory and processes a memory access request from the processor by the pipeline which is divided into a plurality of process stages (see Japanese Unexamined Patent Application Publication No. 10-63575, for example). The processor that performs a memory access to the cache memory having the pipeline structure is typically a RISC (Reduced Instruction Set Computer) type microprocessor. The processor may be the one of a CISC (Complex Instruction Set Computer) type or may be a DSP (Digital Signal Processor) for performing a digital signal processing such as a speech processing or an image processing. When the cache memory having the pipeline structure is used in a second cache or in a cache which has a lower order, a higher order cache memory corresponds to the processor that performs a memory access to the cache memory.

It can be expected that throughput is improved by increasing a number of pipeline stage of the cache memory. On the other hand, cache access time, which is the time required to get a result after the processor gives the access request to the cache memory, is increased. The number of pipeline stage of the cache memory is typically two because the increase of the cache access time is undesirable.

On the other hand, especially in a set associative type cache memory, another configuration is also known for reading out of data by accessing only a way that is hit in response to a load request instead of reading out of the data from all the way of the data memory for the purpose of reducing power consumption of the cache memory.

A configuration example of the cache memory having a two-stage pipeline structure is shown in FIG. 5. A cache memory 8 shown in FIG. 5 is a four-way set associative type cache memory and is arranged between a processor 2 and a main memory 3 which is a low-speed memory. The cache memory 8 and the processor 2 are connected by an address bus 4, a data bus 5, and a WAIT signal line 7. And the cache memory 8 and the main memory 3 are connected by a memory bus 6.

A data memory 10 included in the cache memory 8 is configured to store the data corresponding to a subset of the data stored in the main memory 3. A storage area of the data memory 10 is physically or logically divided into four ways. Furthermore, each way is managed by a data storage unit which is a multiple word unit called line. A place where the data is stored in the data memory 10 is designated by decoding a lower part of an input address which is supplied from the address bus 4. More specifically, the line is designated by an index address which is a higher order part of the lower part of the input address and a word position in the line is designated by a word address which is the lowest part of the input address. An example of the input address is shown in FIG. 7. Each bit number of the above-described word address, the index address, and a tag address which is arranged in a higher part of the word address and the index address is decided depending on how a number of ways of the cache memory 8, a number of lines included in one way, and a number of words included in one line are designed.

A tag memory 11 is configured to store the tag address corresponding to the data stored in line in the data memory 10. The tag memory 11 receives the index address value included in the input address and outputs the tag address identified by decoding the index address. The cache memory 8 shown in FIG. 5 is the four-way type cache memory and outputs four tag addresses corresponding to the four ways in response to one index address which is input. The tag memory 11 has a valid flag (not shown) showing a validity of the stored tag address and a dirty flag (not shown) showing that there is a mismatch between the data stored in the data memory 10 and the data stored in the main memory 3 due to the data memory 10 being updated by the store access.

A hit decision unit 12 makes a decision whether there is a cache hit or a miss hit by comparing the tag address included in the input address with four tag addresses output from the tag memory 11. More specifically, the hit decision unit 12 outputs a signal indicating the cache hit when the tag address included in the input address and the output of the tag memory 11 are matched. The hit decision unit 12 outputs a signal indicating the miss hit when the tag address included in the input address and the output of the tag memory 11 are not matched. The output signal of the hit decision unit 12 is a four-bit signal indicating a hit decision result for one way in one-bit logical value respectively.

A controller 83 controls reading out of the data from the data memory 10 by outputting a chip select signal (CS signal) and a read strobe signal (RS signal) to the data memory 10 when a hit decision result by the hit decision unit 12 is the cache hit. On the other hand, when the hit decision result by the hit decision unit 12 is the miss hit, the controller 83 controls rewriting of the tag memory 11 in order to store the tag address included in the input address in the tag memory 1 and controls data refilling of the data memory 10. The control of the data refilling means the controls of reading out of the data from the main memory 3 and rewriting of the data memory 10 by the data read out from the main memory 3. The controller 83 outputs a WAIT signal using the WAIT signal line 7 to make a notice to the processor 2 that the miss hit has occurred.

An address latch 14 is a circuit for holding at least the tag address part of the input address for one clock cycle. For example, the address latch 14 can be composed of D flip-flops. The data stored in the address latch 14 is used as a data input to the tag memory 11 when the tag memory 11 is rewritten.

Referring now to FIG. 6, a behavior of the cache memory 8 is described. FIG. 6 shows a pipeline behavior of the cache memory 8 when a load request made by the processor 2 is processed. Part (a) of FIG. 6 shows the behavior when the hit decision result is the cache hit and part (b) of FIG. 6 shows the behavior when the hit decision result is the miss hit. In a first stage of the pipeline, the tag memory 11 receives the input address supplied from the processor 2 and outputs four tag addresses corresponding to the index address of the input address. Also in the same first stage, the hit decision unit 12 performs the hit decision.

When the decision result made by the hit decision unit 12 is the cache hit, the input address, the CS signal, and the RS signal are input to the data memory 10 at a last part of the first stage. As shown in the part (a) of FIG. 6, in a second stage just after the first stage, the data is read out from the data memory 10 and output to the processor 2. The data output from the cache memory 8 is stored in a storage area of the processor 2 such as a general register.

On the other hand, when the decision result made by the hit decision unit 12 is the miss hit, the controller does not output the CS signal and the RS signal at the last part of the first stage. Then as shown in the part (b) of FIG. 6, in the second stage, the controller 83 performs a process of deciding a replacement way and an update process of the tag address corresponding to the line decided as the replacement way held in the tag memory 11 with new tag address included in the input address. In the same second stage, the controller 83 performs a read access to the main memory 3, and the data corresponding to the input address is read out from the main memory 3 and stored in the data memory 10. Also in the same second stage, the data read out from the main memory 3 is output to the processor 2.

As stated above, the cache memory 8 shown in FIG. 5 reads out the tag address from the tag memory 11 and performs the hit decision by the hit decision unit 12 in the first pipeline stage. When the hit decision result is the cache hit, the cache memory 8 reads out a data from a hit way of the data memory 10 and transfers the data which is read out to the processor 2 in the second pipeline stage. On the other hand, when the hit decision result is the miss hit, the cache memory 8 decides the replacement way, updates the tag memory 11, updates the data memory 10 with the data read out from the main memory 3, and transfers the data read out from the main memory 3 to the processor 2 in the second pipeline stage.

However, in the cache memory having the two-stage pipeline as stated above, it is difficult to improve operating frequency of the cache memory 8 because it executes large amount of operations in one stage, and it is impossible to make the whole process fast enough to be satisfied (impossible to improve throughput of the cache memory 8). Therefore, the present inventor tried to make the cache memory having a three or more stage pipeline, and to build a configuration in which the process of reading out of the tag address from the tag memory and the process of hit decision are performed in different pipeline stages. However, as a number of pipeline stages of a cache-memory is increased, the present inventor has faced a problem as described below which prevents an efficient behavior of the cache memory.

Now we assume that the miss hit occurs in one memory access request and the tag memory is updated. The problem here is that this update result of the tag memory due to the occurrence of the miss hit is not reflected to the hit decision made in response to the memory access request which is made immediately after the miss hit occurs. If this situation is left as it is, when the memory access request which is made immediately after the miss hit occurs is the access to the same memory block as the memory access request in which the miss hit occurs, it is decided again that the result is the miss hit and an unwanted data refill process is performed even though the data refilling from the low-speed memory has already performed according to the detection of the miss hit. Similarly, when the memory access request which is made just after the miss hit occurs is the access to the memory block that is to be replaced by the data refill process due to the detection of the miss hit in the memory access request in which the miss hit occurs, it is decided that the result is the cache hit even though it should be decided as the miss hit and the incorrect data is read out.

As one solution to prevent the unwanted data refill action and to prevent the incorrect data from being read out from the cache memory as described above, we also examined to adopt another architecture. In this architecture, when the miss hit occurs in one memory access request, the process of the subsequent memory access request is performed again from the beginning of the pipeline, in other words from the process of accessing to the tag memory. This architecture is the one that is adopted in the RISC type microprocessor, for example. However, this architecture also causes other problems that a hardware size is increased and a complexity of a control section for controlling a retry sequence is increased.

SUMMARY

One embodiment of the present invention is a cache memory arranged between a processor and a low-speed memory and performing a pipeline processing of a memory access made by the processor. The cache memory includes a data memory, a tag memory, a hit decision unit, a latch circuit, a bypass circuit, and a controller. The data memory stores data corresponding to a subset of the low-speed memory. The tag memory stores tag addresses corresponding to the data stored in the data memory. The hit decision unit decides whether there is a cache hit or a miss hit by comparing at least one tag address acquired by searching the tag memory using an index address included in an input address supplied from the processor with a tag address included in the input address. The latch circuit holds the tag address included in the input address. The bypass circuit provides the tag address held by the latch circuit to the hit decision unit by bypassing the tag memory. The controller controls an update process of the tag memory by the tag address included in the input address, an update process of the data memory by reading out of the data from the low-speed memory, and a behavior of the bypass circuit when the hit decision result is a miss hit.

In the cache memory according to the one embodiment of the present invention, it is possible to reflect an update result of the tag memory due to the occurrence of the miss hit in a preceding memory access request on the hit decision in a subsequent memory access request even when the miss hit occurs in the preceding memory access request. Therefore, it is possible to prevent an incorrect decision when the hit decision is made in response to the subsequent memory access request, to suppress an unwanted data refill behavior, and to avoid outputting the incorrect data from the data memory.

Moreover, in the cache memory according to the one embodiment, even when the miss hit occurs in the preceding memory access request, there is no need to retry the process of the subsequent memory access request again from the process of accessing to the tag memory. Therefore, a redundant hardware is not needed for performing the process again from the process of accessing to the tag memory.

For example, the cache memory according to the one embodiment of the present invention may perform operations described in below. The cache memory performs a process of reading out of the tag address from the tag memory using the index address in a first pipeline stage. Next, in a second pipeline stage after the first pipeline stage, the cache memory performs a decision process by the hit decision unit. Then when the hit decision result at the second pipeline stage is the miss hit, the cache memory performs controlling of an update of the tag memory by the controller and controlling of the bypass circuit in order to input the tag address held by the latch circuit to the hit decision unit by bypassing the tag memory in a third pipeline stage and performs an update process of the data memory by reading out of the data from the low-speed memory and a process of outputting of the data read out from the low-speed memory to the processor in a fourth or later pipeline stage. The third pipeline stage is just after the second pipeline stage. The fourth pipeline stage is just after the third pipeline stage.

According to the present invention, even when a multi-staging of the pipeline of the cache memory is developed, it is possible to provide the cache memory that is able to efficiently process a successive memory accesses.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

Figure 1:
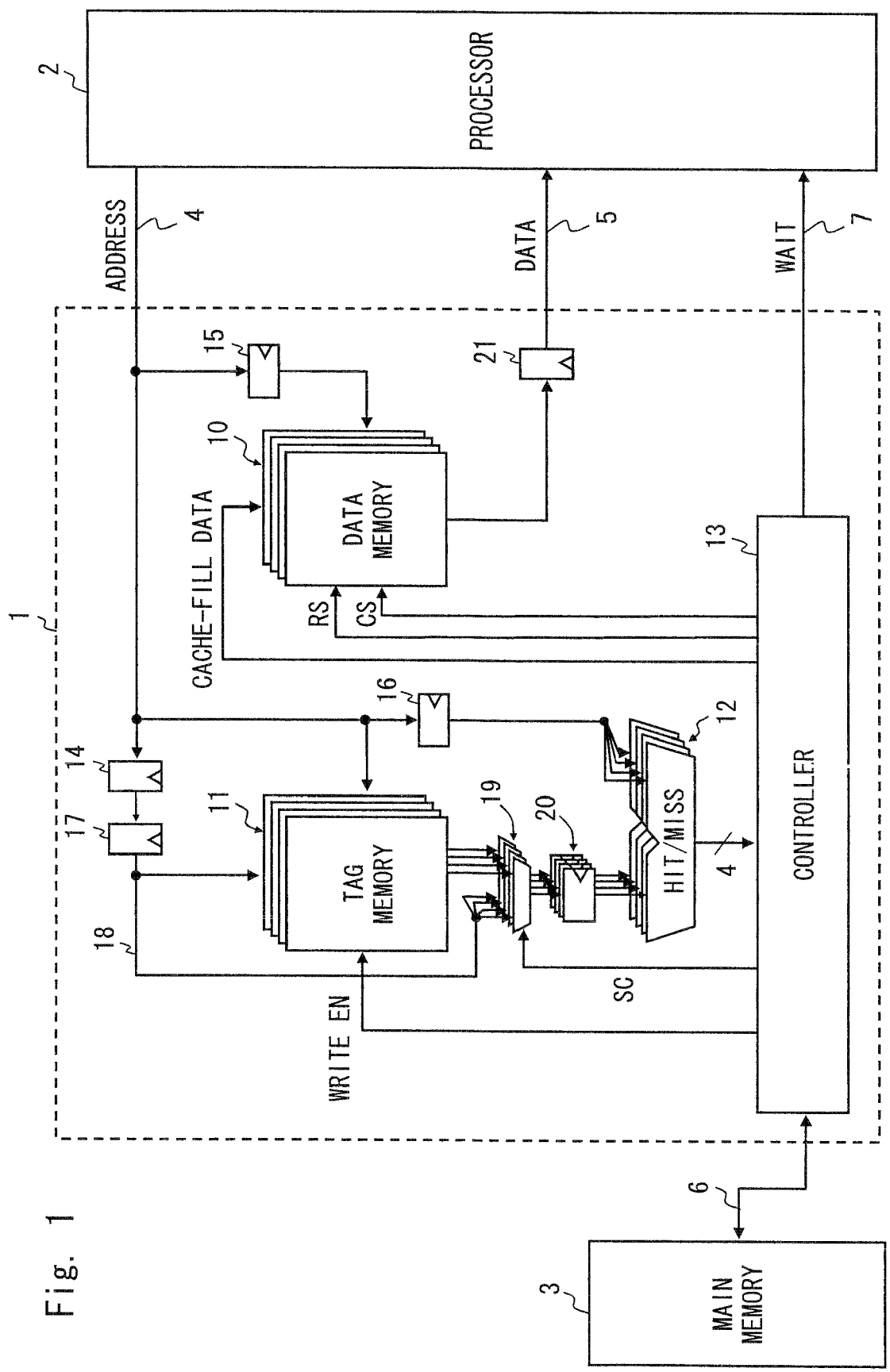
FIG. 1 is a configuration diagram of a cache memory according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

A specific embodiment to which the present invention applies will now be described in detail below with reference to the drawings. In each drawing, the same reference numerals are used for the same components. The overlapping description is appropriately omitted for the sake of clarity.

Figure 5:
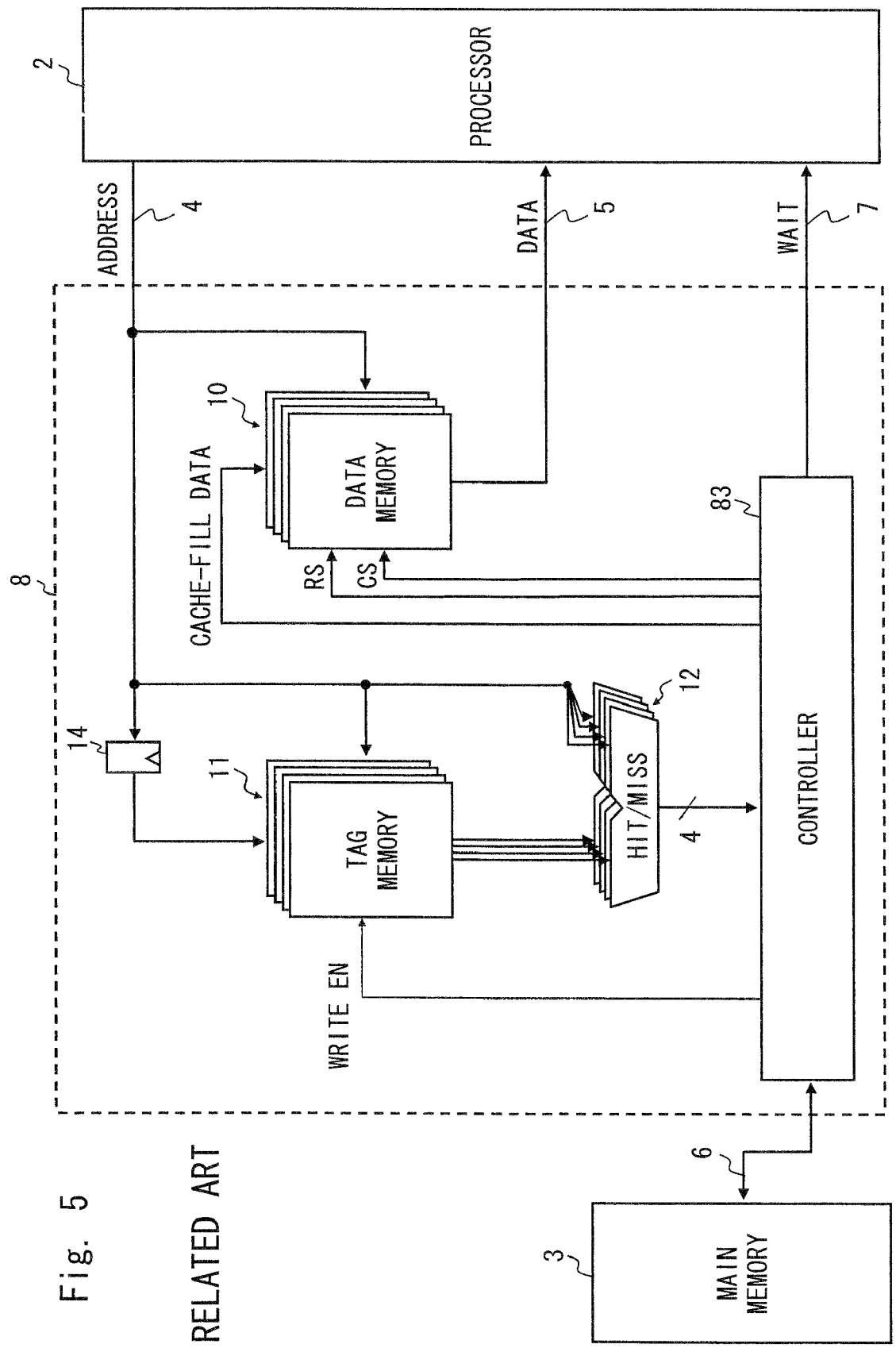
FIG. 5 is a configuration diagram of a cache memory of a Related Art.
Figure 6:
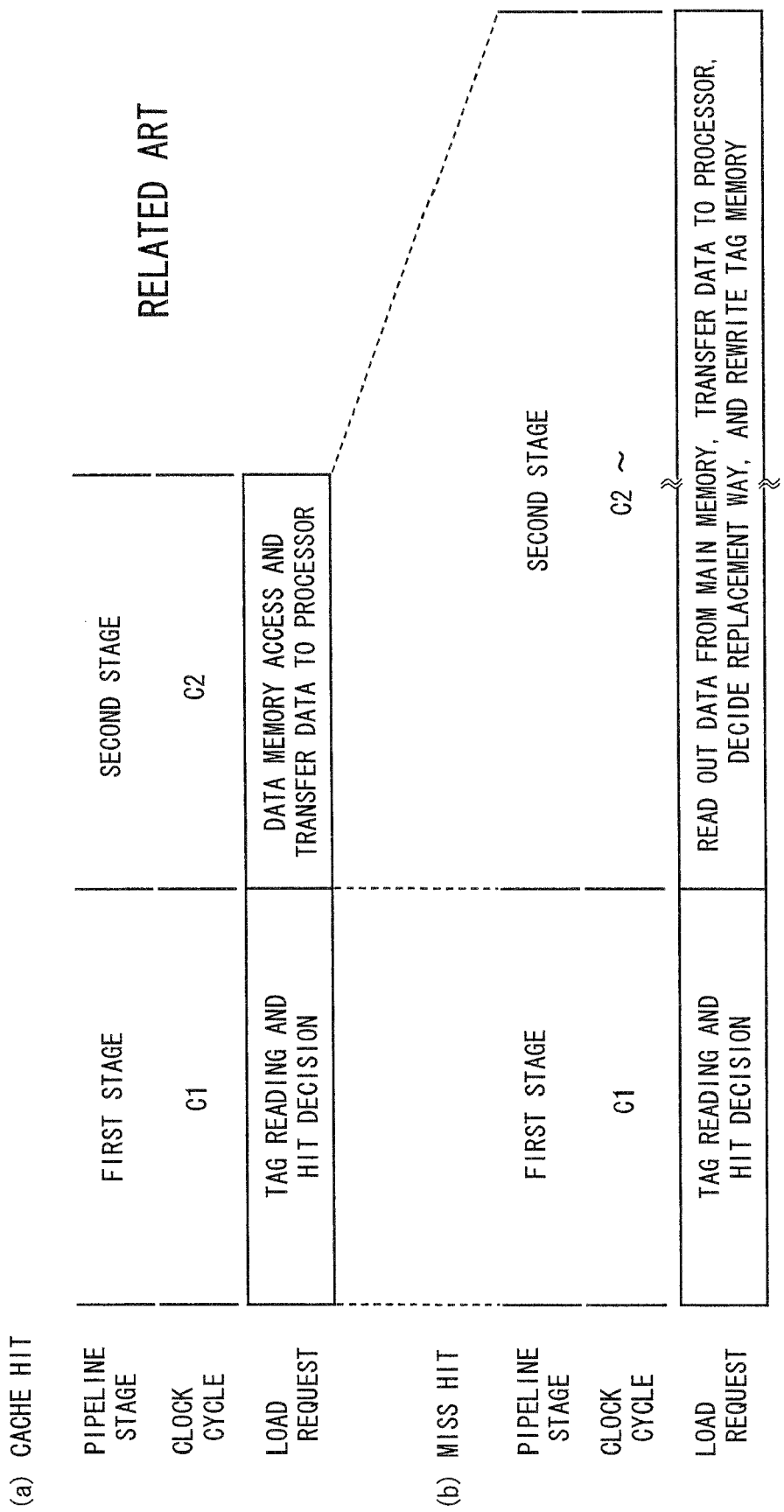
FIG. 6 is a diagram showing a cache memory pipeline process of the Related Art.
Figure 7:
FIG. 7 is a diagram showing an example of an input address of the Related Art.

A configuration of a cache memory 1 according to the present embodiment is shown in FIG. 1. The cache memory 1 is a four-way set associative type cache memory. We assume that the cache memory here is the four-way set associative configuration so that the cache memory 1 and a cache memory 8 of a Related Art shown in FIG. 5 are easily compared. However, such a configuration is merely one example. A number of ways of the cache memory 1 may be other than four or the cache memory 1 may be a direct-map type cache memory.

The components of a data memory 10, a tag memory 11, a hit decision unit 12, and an address latch 14, all of which are included in the cache memory 1, is the same as the components shown in FIG. 5. Therefore, the same reference numerals are given to the corresponding components and detailed description will be omitted here.

A behavior of a controller 13 included in the cache memory 1 is the same as a behavior of a controller 83 of the Related Art when a hit decision result is a cache hit. More specifically, the controller 13 controls reading out of data from the data memory 10 by outputting a chip select signal (CS signal) and a read strobe signal (RS signal) to the data memory 10 when it is decided by the hit decision unit 12 that the result is the cache hit. On the other hand, when it is decided by the hit decision unit 12 that the result is the miss hit, the controller 13 controls rewriting of the tag memory 11 in order to store the tag address included in the input address in the tag memory 11, data refilling of the data memory 10, and a behavior of a selector 19 described below.

The cache memory 1 has more latch circuits for holding an intermediate data between the pipeline stages than the cache memory 8 shown in FIG. 5 has because the cache memory 1 adopts the four-stage pipeline structure. Address latches 15 to 17, 20 and a data latch 21 correspond to the larch circuits. The address latch 15 is a circuit for holding at least an index address part and a word address part of the input address. The address latches 16 and 17 as well as the address latch 14 are circuits for holding at least a tag address part of the input address.

The address latch 20 is a circuit for holding the intermediate data between the selector 19 and the hit decision unit 12. The address latch 20 is configured to be able to hold four tag addresses output from the tag memory 11 in response to the input address. For example, the address latch 20 may have four D flip flop circuits, each of which can hold one tag address.

The data latch 21 is a circuit for holding a data output from the data memory 10. In other words, the data latch 21 is arranged to divide a process of accessing the data memory 10 and a process of transferring the data to the processor 2 in separate pipeline stages.

A bypass line 18 and the selector 19 comprise a bypass circuit for inputting the data held in the address latch 17 to the hit decision unit 12 by bypassing the tag memory 11. An operation of the selector 19 is controlled by a control signal (SC signal) output from the controller 13.

Figure 2:
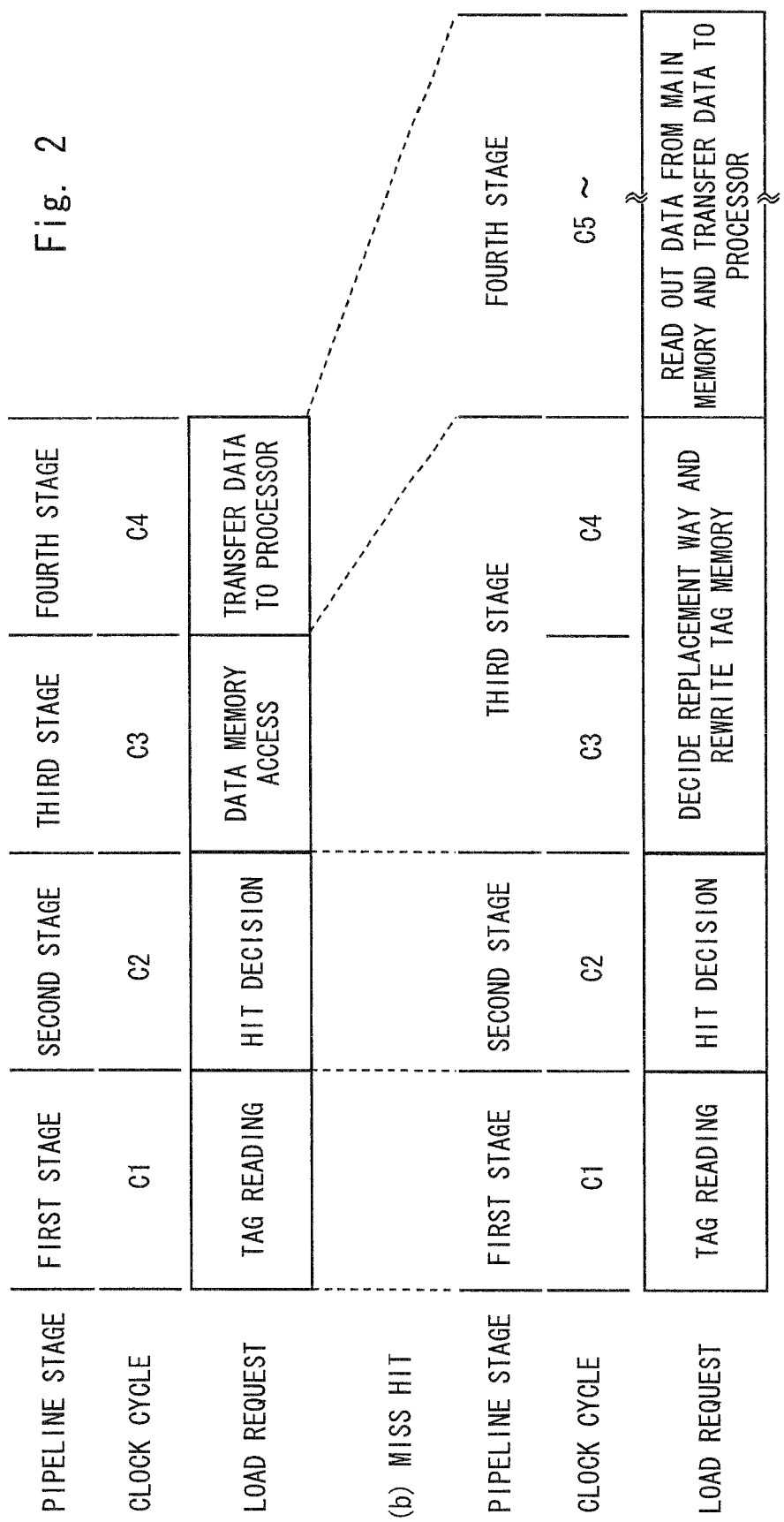
FIGS. 2 to 4 are diagrams showing a pipeline process made by the cache memory according to the embodiment of the present invention.

Referring now to FIG. 2, a behavior of the cache memory 1 will be described. FIG. 2 shows a pipeline behavior of the cache memory 1 when a load request made by the processor 2 is processed. Part (a) of FIG. 2 shows the behavior when the hit decision result is the cache hit and part (b) of FIG. 2 shows the behavior when the hit decision result is the miss hit. In a first stage of the pipeline, the tag memory 11 receives the input address supplied from the processor 2 and output four tag addresses corresponding to the index address of the input address. The four tag addresses output from the tag memory 11 are held in the address latch 20 through the selector 19.

Next, in a second stage just after the first stage, the hit decision is made by the hit decision unit 12. The hit decision unit 12 compares the tag address included in the input address held in the address latch 16 with the tag address held in the address latch 20.

When the decision made by the hit decision unit 12 is the cache hit, the input address, the CS signal, and the RS signal are input to the data memory 10 at a last part of the second stage. Then as shown in the part (a) of FIG. 2, in a third stage just after the second stage, the data is read out from the data memory 10 and the data which is read out is held in the data latch 21. Lastly, in a fourth stage just after the third stage, the data held in the data latch 21 are transferred to the processor 2 and are stored in a storage area of the processor 2 such as a general register.

On the other hand, when the decision made by the hit decision unit 12 is the miss hit, the outputs of the CS signal and the RS signal at the last part of the second stage are not performed. Then as shown in the part (b) of FIG. 2, in the third stage just after the second stage, the controller 13 performs a process of deciding a replacement way and an update process of the tag address decided as the replacement way held in the tag memory 11 with the tag address included in the input address. The decision of the replacement way can be performed by using decision methods such as a random method for selecting the way at random from the four ways or an LRU (Least Recently Used) method for selecting the way that has not been referred to for the longest period of time.

Moreover, the controller 13 controls the selector 19 in the third stage and updates the address latch 20 which holds the tag address corresponding to the replacement way with a storage value of the address latch 17, in other words the tag address of the input address.

The controller 13 performs the process of deciding the replacement way and the update process of the tag memory 11, and performs controlling of the selector 19 as described above in the first clock cycle of the third stage, which means in the C3 cycle shown in the part (b) of FIG. 2. The controller 13 also stalls the pipeline behavior by one clock cycle by outputting a WAIT signal.

In the fourth stage just after the second cycle of the third stage in which the pipeline behavior was stalled, a read access is performed to the main memory 3 connected to the memory bus 6. Then the data corresponding to the input address is read out from the main memory 3 and is stored in the data memory 10. Also in the same fourth stage, the data read out from the main memory 3 is output to the processor 2.

Figure 3:
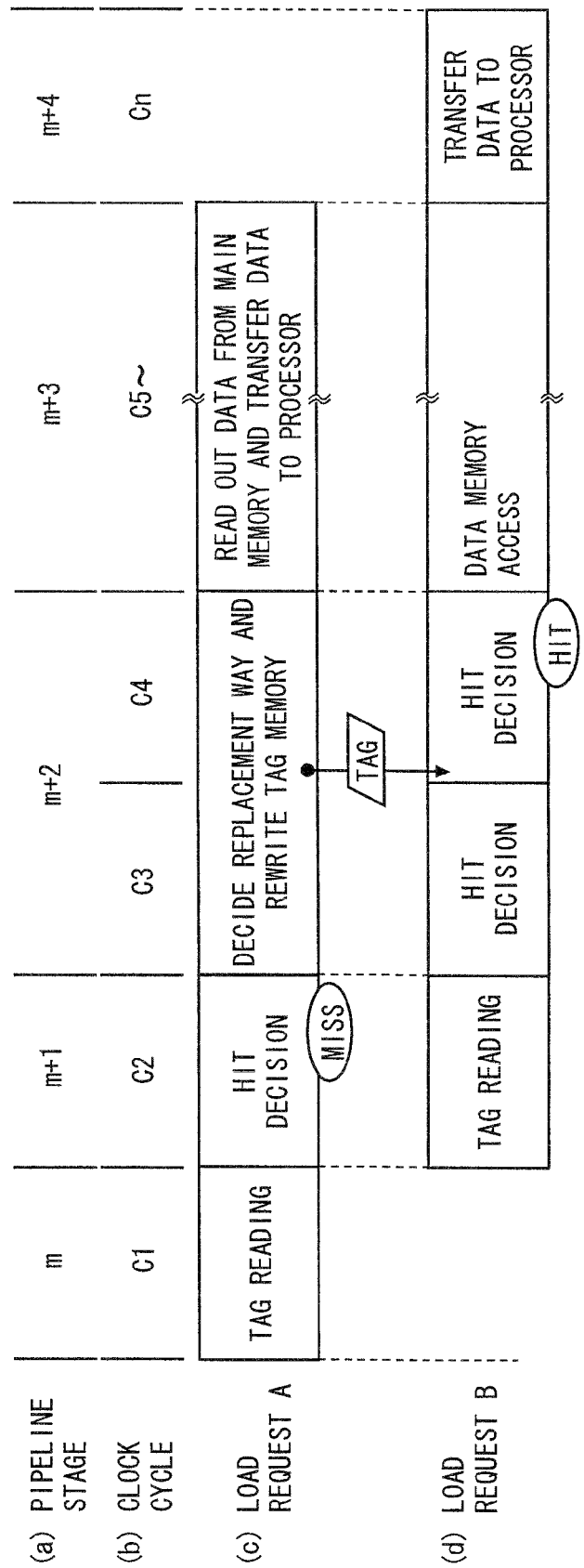
Figure 4:
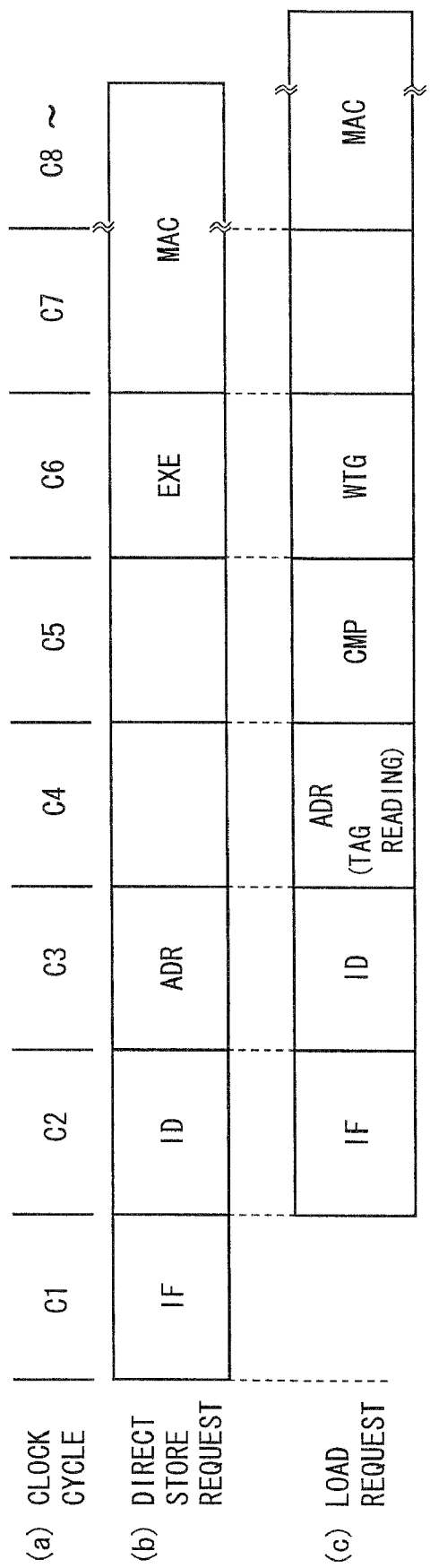

Referring now to FIGS. 3 and 4, an effect of the cache memory 1 working as above will be described. FIG. 3 is a timing chart showing the pipeline processing of the cache memory 1 when two load requests (load requests A and B) are successively received. More specifically, FIG. 3 shows the process when the miss hit occurs in the preceding load request A.

As shown in FIG. 3, when the decision result in the second stage of the load request A (m+1 stage) is the miss hit, the replacement way is decided and the tag memory 11 is rewritten in the subsequent first cycle (C3 cycle) of the third stage (m+2 stage). And the tag address that is to be stored in the tag memory 11 is supplied to the address latch 20 by bypassing the tag memory 11 by the bypass line 18 and the selector 19. Then the pipeline is stalled by one cycle.

Note that the process in response to the subsequent load request B has begun in parallel with the process in response to the above-described load request A. Specifically, in the m+1 stage which is the second stage of the load request A, the tag address is read out from the tag memory 11 as the process in the first stage of the load request B. In other words, when the tag address in the load request B is read out, the update of the tag memory 11 in response to the miss hit of the preceding load request A has not completed. In the second stage of the load request B (m+2 stage), the hit decision is made about the load request B. This hit decision is however performed without reflecting the update result of the tag memory 11 in response to the miss hit of the preceding load request A.

However, the hit decision of the load request B which is performed again in the second cycle of the m+2 stage (C4 cycle) in which the pipeline behavior is stalled is made using the new tag address given to the address latch 20 by bypassing the tag memory 11.

As stated above, according to the cache memory 1 of the present embodiment, it is possible to reflect the update result of the tag memory 11 due to the occurrence of the miss hit in a preceding memory access request on the hit decision in a subsequent memory access request even when the miss hit occurs in the preceding memory access request. Therefore, it is possible to prevent an incorrect decision when the hit decision is made in response to the subsequent memory access request, to suppress an unwanted data refill behavior, and to avoid outputting the incorrect data from the data memory 10.

Moreover, as shown in FIG. 3, in the cache memory 1, even when the miss hit occurs in the preceding memory access request, there is no need to retry the process of the subsequent memory access request again from the process of reading out of the tag memory 11. Therefore, a redundant hardware is not needed for performing the process again from the process of reading out of the tag memory 11. In addition, it is possible to prevent cache access time of the subsequent memory access request from being increased because there is no need to retry the process of reading out of the tag memory 11.

Moreover, the cache memory 1 is effective in a point below. FIG. 4 is a timing chart showing a case in which a direct store request and the load request are successively performed. In the direct store request, the processor 2 writes the data directly to the main memory 3 without involving the cache memory 1. The load request is made for the cache memory 1, as will be clear from the above description. The pipeline of the direct store request shown in the part (b) of FIG. 4 is the pipeline of the processor 2 and the pipeline of the load request shown in the part (c) of FIG. 4 is the pipeline of the cache memory 1.

The direct store request shown in the part (b) of FIG. 4 is performed in a six-stage pipeline from an IF stage (C1 cycle) to an EXE stage (C6 cycle) in the processor 2. More specifically, in the IF stage (C1 cycle), an instruction is taken from an instruction cache. In an ID stage (C2 cycle), the fetched instruction is decoded. In an ADR stage (C3 cycle), a calculation of an effective address is performed. In the EXE stage (C6 cycle), the data is written into the main memory 3. When the data is written into the main memory 3, it is more common to write the data first into a store buffer (not shown) than to write the data directly to the main memory 3 for the purpose of preventing the processor 2 being stalled due to a speed difference between a bus speed of the memory bus 6 and a processing speed of the processor 2. When the data is written first to the store buffer, only the outputting of the data to the store buffer is performed in the EXE stage (C6 cycle). The data is written to the main memory 3 in C7 cycle or in a later cycle which comes after the EXE stage.

As stated above, when an actual access to the main memory 3 is made by the direct store request in the C7 cycle or in the later cycle, the data is still in the middle of being written into the store buffer in the C6 cycle and the access request made by the store buffer has not output to the memory bus 6 yet. Therefore, if the access request by the cache memory 1 in which the miss hit is detected is made first in the C6 cycle in FIG. 4, the data is read out first from the main memory 3 due to the miss hit because there is no competing access request and the access to the memory bus 6 by the previous store instruction (direct store access) is performed later. If both the direct store request and the load request are made for the same address, a program cannot normally be performed any more because the process order has been interchanged.

However, in the cache memory 1 according to the present invention, the data is read out from the main memory 3 in the last stage of the pipeline when the miss hit occurs. Therefore, in the timing chart shown in the part (c) of FIG. 4, the cache memory 1 does not access the memory bus 6 before a C8 cycle, which means the access to the memory bus 6 by the store buffer has begun before the access is made by the cache memory 1. Note that, in the part (c) of FIG. 4, a CMP stage in a C5 cycle is the pipeline stage in which the hit decision is made. A WTG stage in a C6 cycle is the pipeline stage in which the tag memory 11 is updated due to the miss hit. An MAC stage in the C8 cycle or in the later cycle is the pipeline stage in which the data is read out from the main memory 3 and the data which is read out is transferred to the processor 2. As shown in FIG. 4, if the access request to the memory bus 6 made by the store buffer (not shown) and the access request to the memory bus 6 made by the cache memory 1 are concurrently occurred, or if the access request made by the cache memory 1 occurs later than the access request made by the store buffer, a bus controller (not shown) of the memory bus 6 can control the access request according to an order for performing the instruction. Therefore, even when both the direct store request and the load request are made for the same address, the program can normally be performed.

Note that the configuration of the cache memory 1 is merely one example, and various changes can be made. For example, the number of pipeline stage is not limited to four stages. In addition, the specific configuration of the controller 13 may be a set of a plurality of circuits. For example, the controller 13 may calculate the replacement way, control the selector 19, and control the access to the main memory 3 by using separate circuits respectively.

Also in other embodiments of the present invention, there is a cache memory including a part of the configuration included in the cache memory 1 described above. More specifically, we assume the cache memory for performing the process of reading out of the tag memory 11 and the process of the hit decision in the separate pipeline stages. And when the miss hit occurs, the decision of the replacement way and rewriting of the tag memory 11 are performed in the pipeline stage just after the pipeline stage which performs the hit decision. At the same time, the tag address corresponding to the access request in which the result was the miss hit is forwarded to the hit decision of the subsequent access request by bypassing the tag memory 11. By having such a configuration, the error of the hit decision can be prevented without retrying the subsequent access request from the beginning of the pipeline.

In addition, the cache memory 1 as described above stalls the pipeline by one cycle when the miss hit occurs. This configuration is effective in that information of the tag address which is to be replaced can definitely be reflected on the hit decision of the subsequent memory access request. However, it is also possible that the information of the tag address which is to be replaced can be reflected on the hit decision of the subsequent memory access request without stalling the pipeline by speeding up the decision process of the replacement way by deciding the replacement way in the random method, for example.

Furthermore, it is apparent that the present invention is not limited to the above embodiment, but may be modified and changed without departing from the scope and spirit of the invention.

What is claimed is:

1. A cache memory arranged between a processor and a low-speed memory and performing a pipeline processing of a memory access made by the processor, comprising:
   a data memory being configured to store data corresponding to a subset of data stored in the low-speed memory;
   a tag memory being configured to store tag addresses corresponding to the data stored in the data memory;
   a hit decision unit being configured to decide whether there is a cache hit or a miss hit by comparing at least one tag address, acquired by searching the tag memory using an index address included in an input address supplied from the processor, with a tag address included in the input address;
   a latch circuit being configured to hold the tag address included in the input address supplied from the processor;
   a bypass circuit comprising a bypass line and a selector for selectively inputting the tag address held in the latch circuit to an input of the hit decision unit by bypassing the tag memory; and
   a controller being configured to control an update process of the tag memory by rewriting a tag address, corresponding to one of said at least one tag address and stored in the tag memory, with the tag address included in the input address, an update process of the data memory with data corresponding to the input address by reading out of the data corresponding to the input address from the low-speed memory, and a behavior of the bypass circuit so that the tag address held in the latch circuit is an input to the hit decision unit by bypassing the tag memory, when the hit decision result is the miss hit.

2. The cache memory according to claim 1, wherein the cache memory performs:
   a process of reading out of the tag address from the tag memory using the index address in a first pipeline stage;
   a decision process by the hit decision unit in a second pipeline stage after the first pipeline stage; and
   a process of controlling of an update of the tag memory by the controller and controlling of the bypass circuit in order to input the tag address held by the latch circuit to the hit decision unit by bypassing the tag memory in the third pipeline stage, and an update process of the data memory by reading out of the data from the low-speed memory and a process of outputting of the data read out from the low-speed memory to the processor in a fourth pipeline stage just after the third pipeline stage or in a later pipeline stage when the hit decision result at the second pipeline stage is the miss hit.

3. The cache memory according to claim 2, wherein the update process of the data memory by reading out of the data from the low-speed memory is performed in a last pipeline stage.

4. The cache memory according to claim 2, wherein at least two clock cycles are assigned to the third pipeline stage, the controller performs the update of the tag memory by a clock cycle before a final clock cycle of the third pipeline stage, and the controller controls the behavior of the bypass circuit so that the tag address held by the latch circuit is input to the hit decision unit in the final clock cycle when the hit decision result by the hit decision unit is the miss hit.

5. A method for controlling a cache memory performing a pipeline processing of a memory access made by a processor, the method comprising:
   a data memory being configured to store data corresponding to a subset of data stored in a low-speed memory;
   a tag memory being configured to store tag addresses corresponding to the data stored in the data memory;
   a hit decision unit being configured to decide whether there is a cache hit or a miss hit by comparing at least one tag address, acquired by searching the tag memory using an index address included in an input address supplied from the processor, with a tag address included in the input address;
   a latch circuit being configured to hold the tag address included in the input address supplied from the processor; and
   a bypass circuit comprising a bypass line and a selector for selectively inputting the tag address held in the latch circuit to an input of the hit decision unit by bypassing the tag memory, wherein the method comprises:
   executing a process of reading out of said at least one tag address from the tag memory using the index address;
   executing a decision process by the hit decision unit;
   executing, using a controller, controlling of an update of the tag memory by rewriting a tag address, corresponding to one of said at least one tag address and stored in the tag memory, with the tag address held in the latch circuit, when the hit decision result by the hit decision unit is miss hit;

executing, using the controller, controlling of the bypass circuit so that the tag address held in the latch circuit is input to the hit decision unit by bypassing the tag memory stage, when the hit decision result by the hit decision unit is miss hit; and executing, using the controller, an update process of the data memory with data corresponding to the input address by reading out of the data corresponding to the input address from the low-speed memory, when the hit decision result by the hit decision unit is miss hit.

6. The method according to claim 5, wherein:

said executing the process of reading out of said at least one tag address is executed in a first pipeline stage, said executing the decision process is executed in a second pipeline stage after the first pipeline stage, said executing controlling of the update of the tag memory and controlling of the bypass circuit are executed in a third pipeline stage after the second pipeline stage, and said controlling of the update process of the data memory is executed in a fourth pipeline stage after the third pipeline stage or in a later pipeline stage.

7. The method according to claim 6, wherein the method further comprises assigning at least two clock cycles to the third pipeline stage, wherein:

the update of the tag memory is performed by a clock cycle before a final clock cycle of the third pipeline stage, and the bypass circuit is controlled so that the tag address included in the input address is input to the hit decision unit in the final clock cycle when the hit decision result by the hit decision unit is the miss hit.

8. A cache memory performing a pipeline processing of a first load request and a second load request sequentially received in this order, the first load request specifying a first tag address and a first index address, the second load request specifying a second tag address and a second tag address and a second index address, the cache memory comprising:

a data memory configured to store data corresponding to a subset of data stored in a main memory coupled to the cache memory;

a tag memory configured to store tag addresses corresponding to the data stored in the data memory, configured to receive the first index address to output a first tag address group corresponding to the first index address in a first pipeline stage, and configured to receive the second index address to output a second tag address group corresponding to the second index address in a second pipeline stage being a next pipeline stage of the first pipeline stage, the first tag address group consisting of at least one tag address corresponding to the first index address, the second tag address group consisting of at least one tag address corresponding to the second index address;

an address latch coupled to the tag memory to store the first tag address group in the first pipeline stage and to store the second tag address group in the second pipeline stage;

a hit decision unit coupled to the address latch to compare the first tag address with the first tag address group to decide whether the first load request in a cache hit or a miss hit in the second pipeline stage, to compare the second tag address with the second tag address group to decide whether the second load request is a cache hit or a miss hit in a third pipeline stage being a next pipeline stage of the second pipeline stage; and a controller configured to control an update process of the tag memory and the address latch and to stall the pipeline processing in the third pipeline stage when the hit decision unit decides that the first load request is the miss hit, one of tag address in the first tag address group stored in the tag memory being updated with the first tag address in the update process, one of tag addresses in the second tag address group stored in the address latch being updated with the first tag address in the update process, the address latch storing a third tag address group including the first tag address based on the update process, wherein the hit decision unit decides again whether the second load request is the cache hit or the miss hit based on the stalling pipeline processing by comparing the second tag address with the third tag address group stored in the address latch.

9. The cache memory according to claim 8, wherein the controller performs an update process of the data memory in a fourth pipeline stage being a next pipeline stage of the third pipeline stage when the hit decision unit decides that the first load request is the miss hit, the data stored in the data memory being updated with data stored in the main memory and corresponding to the first tag address and the first index address in the update process of the data memory.

10. The cache memory according to claim 8, further comprising:

a selector coupled between the tag memory and the address latch to select one of the first tag address, the first tag address group, and the second tag address group.

11. The cache memory according to claim 10, wherein the selector selects the first tag address group in the first pipeline stage, selects the second tag address group in the second pipeline stage, and selects the first tag address in the third pipeline stage.

12. The cache memory according to claim 8, further comprising;

a first latch circuit configured to store the first tag address;

a second latch circuit coupled between the first latch circuit and the tag memory to receive the first tag address from the first latch circuit and store the received first tag address; a third latch circuit coupled to the first latch circuit and the hit decision unit to store the first tag address; and a fourth latch circuit coupled to data memory to store the first index address.

13. The cache memory according to claim 12, further comprising:

a fifth latch circuit coupled to the data memory to store data output from the data memory.

14. The cache memory according to claim 8, wherein the cache memory receives the first and second load requests from a processor coupled to the cache memory.

15. The cache memory according to claim 8, wherein the main memory is a low-speed memory coupled to the cache memory.

16. The cache memory according to claim 8, wherein the controller outputs a wait signal to stall the pipeline processing in the third pipeline stage.

* * * * *